Aug. 4, 1931. P. J. ASHWORTH 1,817,663
ROTARY INTERNAL COMBUSTION ENGINE
Filed April 19, 1929 5 Sheets-Sheet 3

Inventor:
Percy J. Ashworth
By
Attorneys.

Aug. 4, 1931.  P. J. ASHWORTH  1,817,663
ROTARY INTERNAL COMBUSTION ENGINE
Filed April 19, 1929   5 Sheets-Sheet 5
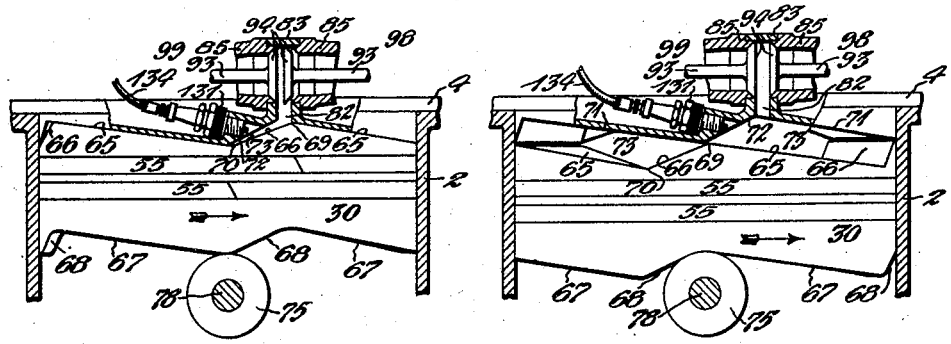
Fig. 7.   Fig. 9.
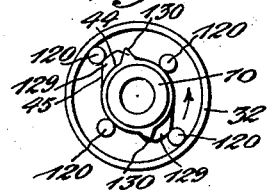 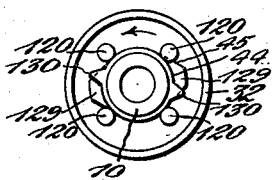
Fig. 8.   Fig. 10.
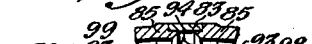
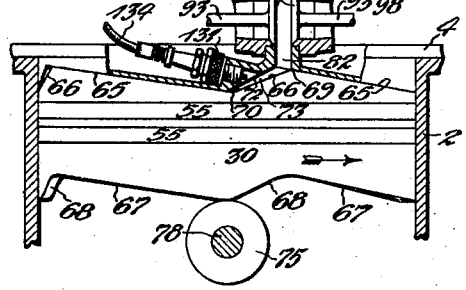
Fig. 11.   Fig. 13.
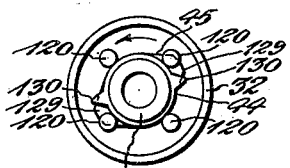
Fig. 12.   Fig. 14.
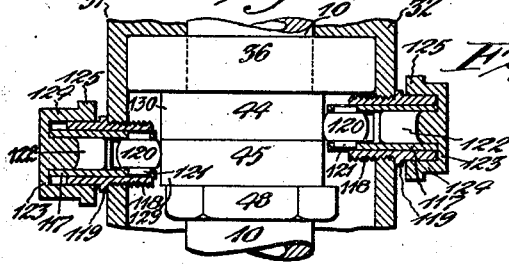
Fig. 15.
Inventor:
Percy J. Ashworth
By
Pennington & White
Attorneys.

Patented Aug. 4, 1931

1,817,663

UNITED STATES PATENT OFFICE

PERCY J. ASHWORTH, OF CRANSTON, RHODE ISLAND

ROTARY INTERNAL COMBUSTION ENGINE

Application filed April 19, 1929. Serial No. 356,516.

This invention relates to improvements in hydrocarbon or internal combustion engines and particularly to an engine or motor of the rotary type as distinguished from reciprocating engines.

One object of the invention is to provide an engine or motor of the type specified having greater efficiency and reliability in use than the present motors generally employed in automobiles and airplanes, or for similar purposes.

Another object of the invention is to provide an engine or motor having a substantially constant and uniform flow of power by eliminating the usual crank-shaft and applying the full power impulse from the explosion of the fuel charge as a turning force on the power-output shaft.

Another object of the improvement is to provide an engine or motor of the type specified in which the effective force of the power impulse is augmented by increasing the leverage through which it acts on the power-shaft without increasing the size or bulk of the engine.

Another object of the invention is to provide an engine or motor of the type specified in which the power-shaft is driven from a rotor without the use of pistons, connecting-rods and other reciprocating parts so that the power impulse is applied always in the same direction without reversal in movement of any of the parts whereby to eliminate the effects of momentum and inertia and reduce the weight load on the moving parts.

Another object of the invention is to provide an engine or motor of the type specified driven from a floating rotor which operates with a minimum of friction to attain smoother running and greater power output while materially reducing the wear to secure greater durability and reliability in use.

Another object of the invention is to provide an engine or motor of the type specified having the number of its operating parts reduced to a minimum and light in weight to secure a low production cost, greater reliability and less cost of maintenance in use, and particularly to adapt it for use as a power unit for airplanes and dirigibles.

Further objects of the improvement are set forth in the following specification which describes a preferred form of construction of the invention by way of example as illustrated by the accompanying drawings.

In the drawings:

Fig. 7 is a more or less diagrammatic view showing the motor cylinder in section to illustrate the position of the rotor at the beginning of the intake of the fuel charge with the intake-valve open and the exhaust-valve closed;

Fig. 8 is a view showing the corresponding position of the valve-operating cams at this point in the operation of the motor;

Fig. 9 is a view similar to Fig. 7 showing the position of the rotor at the completion of the intake of the charge with both valves closed;

Fig. 10 is a view of the valve-operating cams at this point in the operation of the motor;

Fig. 11 is a view showing the rotor in position after the compression of the charge with the valves still closed;

Fig. 12 illustrates the position of the valve-operating cams at this point in the operation of the motor;

Fig. 13 is a view showing the position of the rotor after the firing of the charge with the exhaust valve open and the intake-valve closed;

Fig. 14 illustrates the position of the valve-operating cams at this point of the operation of the motor; and Fig. 15 is a sectional detailed view of the cam-mechanism taken on line 15—15 of Fig. 1, showing the arrangement of the cams and the push-rods for operating the valves.

Figure 1:
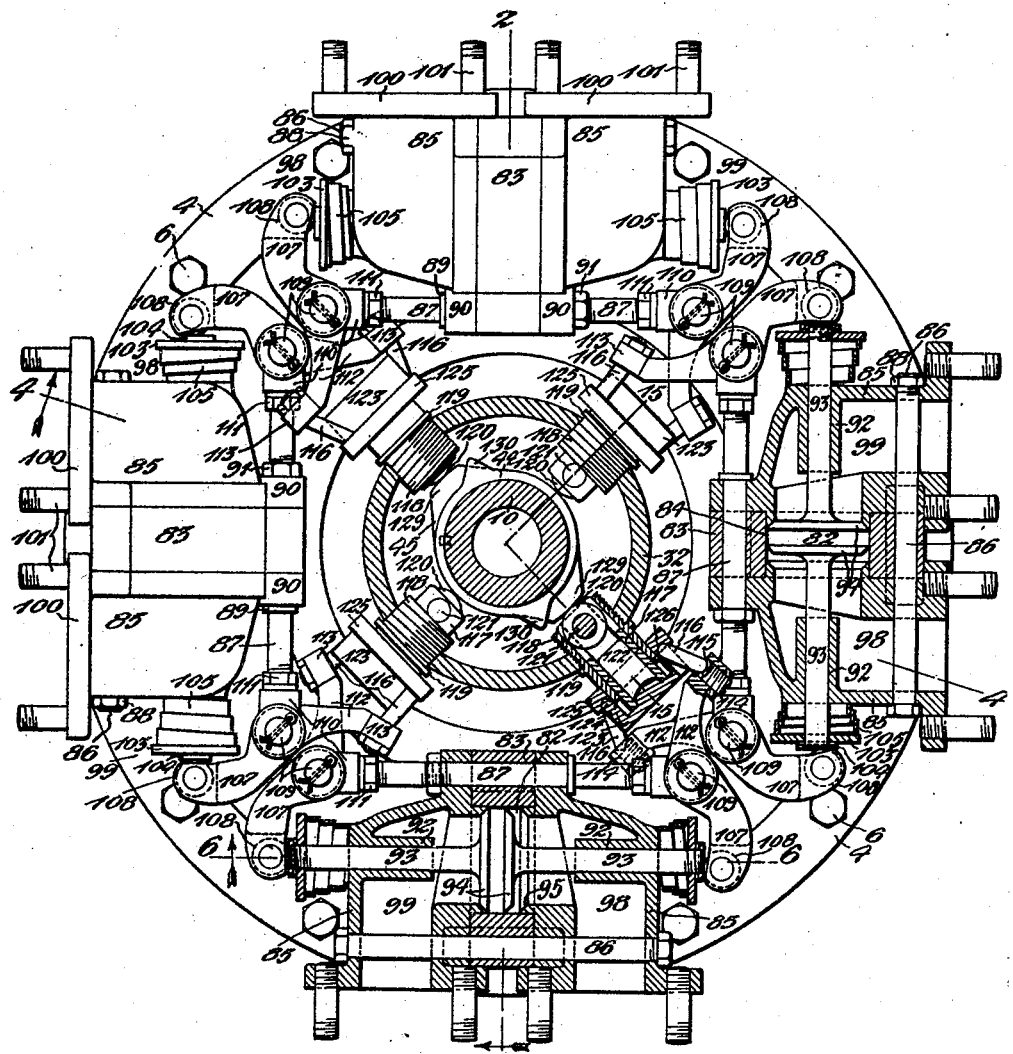
Fig. 1 is an end view of an engine or motor embodying one form of construction of the invention.

The present invention embraces, in general, an engine or motor having an annular rotor mounted within a cylindrical casing and provided with stepped faces which co-operate with corresponding faces on an end head to open and close a plurality of combustion-chambers as the rotor turns and is given an axial sliding movement; means for admitting the charge into the combustion-chambers, exploding it, and scavenging the burned gases; and means for rotatively connecting the rotor with an axial power-output shaft to be driven therefrom.

Referring to the drawings, the invention is herein illustrated by way of example as embodied in a motor having four intake-valves combined with an equal number of associated exhaust-valves so arranged that two power impulses are applied to the rotor during each revolution thereof at points equidistantly spaced about its axis. It is to be understood, however, that the form of construction of the motor may be varied at will to embody a greater or less number of valve units in accordance with requirements. As shown most clearly in Figs. 1 and 2, the main casing of the motor may be constructed in the form of a flanged cylinder 2 having heads 3 and 4 at its ends secured in place by bolts 5 and 6 extending through the flanges.

The end-head 3 is constituted by a substantially flat disk or plate having a central recessed hub 7 braced by ribs 8 and adapted to receive suitable bearings for the axial power-shaft 10. Preferably, the hub 7 is counterbored at 9 to adapt it to receive inner and outer annular races 11 and 12, between which are balls 13 providing friction-reducing journals for the shaft 10. The inner races 11 may be forced onto the reduced end 14 of the shaft which projects through the axial opening in the end of the hub 7, while the outer race 12 may be made in two sections held together by a flanged casing 15 forced into the bore 9 of the hub 7, this being a usual construction for bearings of the present type.

The power-shaft 10 carries a drive-element 20 which, as herein shown, is constructed in the form of a dished plate or spider 21 supported from a central hub 22. The hub 22 is secured rotatively to the shaft 10 by any suitable means such as the spline and key shown at 23 in Fig. 2. As shown most clearly in Fig. 4, the drive-member 20 is provided with an annular rim 24 formed with two opposite slots or openings 25 which are adapted to receive driving connections, to be later described, carried on the rotor 30 and adapted to play in the slots as the rotor oscillates axially within the casing 2. At the end of the hub 22 of the drive-member 20 is a flat thrust-washer 26 fastened in place by screws 27 and adapted to bear against the bearing races 11 and 12 to take the end thrust of the shaft 10 in one direction.

The head 4 which closes the opposite end of the casing or cylinder 2 is provided with valve openings and carries the valve-operating mechanism. As shown most clearly in Figs. 2 and 3, the head 4 comprises two separate parts, its main portion consisting of an annular plate fastened to the flanges of the cylinder 2 by the bolts 6 previously mentioned. Fastened to the inner rim of the annulus 4 by means of bolts 29 is a central recessed member or closure 31 which is formed with a hub 32 carrying a bearing for the axial power-shaft 10, and also an inner annular bearing wall 33 for the rotor 30. The bearing hub 32 is braced from the annular wall 33 by radial ribs 34 to stiffen the structure of this part. Housed within the end of the hub 32 are inner and outer annular ball-races 35 and 36, similar in construction to the races at the opposite end of the shaft, between which run the balls 37. The inner race 35 abuts a shoulder 38 on the shaft 10 at one side and bears against the end of the hub 32 to take the end thrust of the shaft in this direction. Fastened to the end of the bearing hub 32 by means of bolts 39 is a cap or oil retainer 40 provided with a pocket for receiving lubricant. Surrounding the shaft 10 within the cavity of the cap 40 is an oil-ring 41 which distributes the lubricant around the bearing.

The enlarged portion of the shaft 10 inwardly beyond the shoulder 38 carries the cams 44 and 45 for operating the valve-mechanism to be later described. The cams 44 and 45 are keyed to the shaft 10 at 46 and 47 and held in place axially thereof against the inner ball-race 35 by means of a collar 48 screwed onto a threaded portion 49 of the shaft. It is noted here that the shaft 10 is preferably tubular or of hollow construction to render it light in weight, particularly to adapt it for use as the propeller shaft of an airplane. Its end which projects from the bearing 32 may be tapered as shown to adapt it to receive the hub of the propeller and provided with a suitable threaded portion for the nut which fastens the propeller in place. The opposite end of the shaft 10 is shown as provided with a stud 51 having an enlarged portion 52 screwed into its bore. The projecting stud-shaft 51 may be employed for carrying a pulley, gears or the like for driving the magneto, oil pump and other appurtenances to the motor.

The cylindrical wall 33 of the end-closure 31 is arranged in concentric spaced relation with respect to the outer wall of the cylinder or casing 2, thereby providing an annular chamber or raceway within which the ring-shaped rotor 30 rotates. As shown more particularly in Fig. 2, the wall of the casing 2 may be counterbored to receive a relatively thin lining sleeve 53 of wear-resisting material. As also shown in this view, the rotor 30 is of hollow construction to render it light in weight, and let into its inner wall is a lining sleeve 54 of bronze or Babbitt metal. The outer compression-rings 55 corresponding to the piston-rings of reciprocating motors and serving for the same purpose to seal the joint to prevent loss of compression. Similar compression-rings 56 are held in recesses or grooves on the cylindrical bearing wall 33 which conforms to the inner face of the rotor 30.

Figure 2:
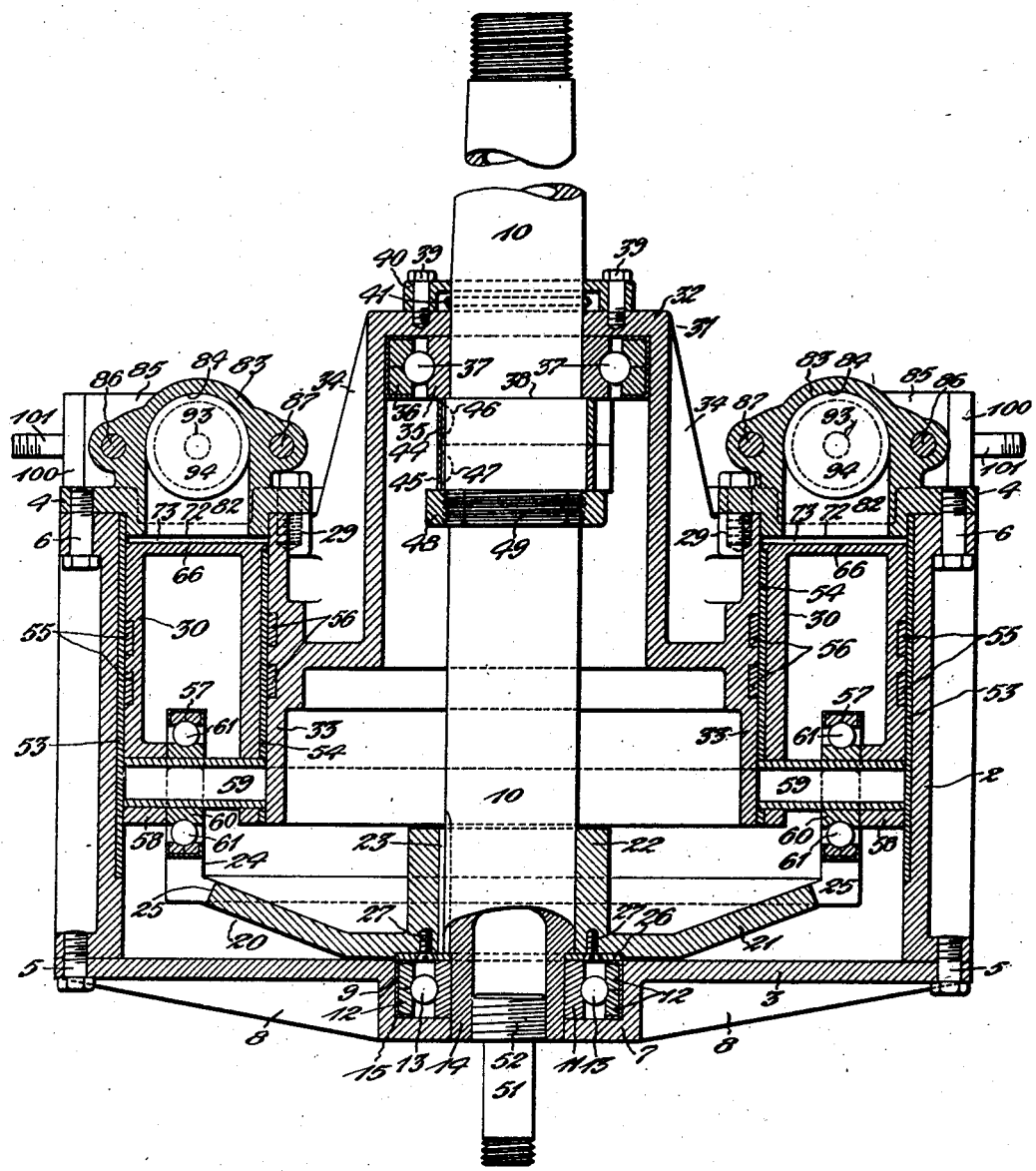
Fig. 2 is an axial sectional view of the same taken on line 2—2 of Fig. 1.
Figure 4:
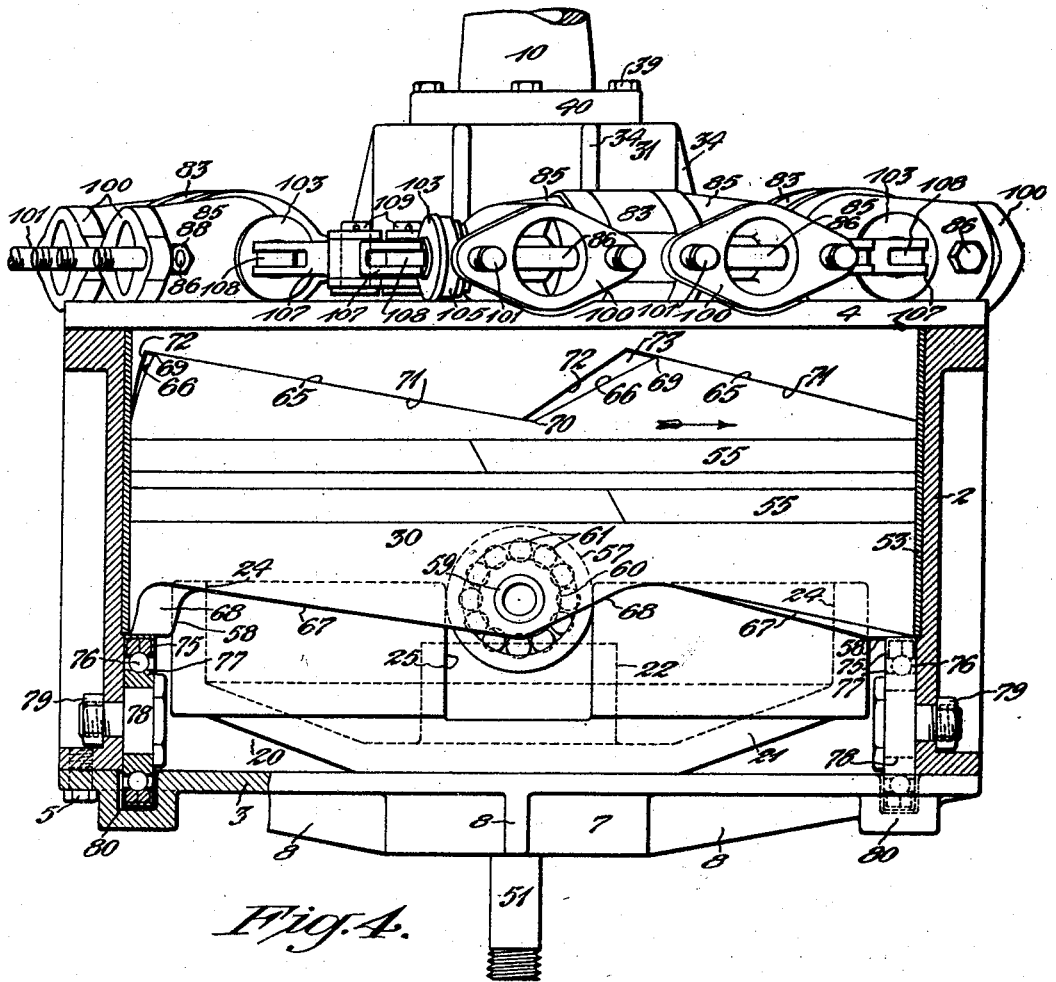
Fig. 4 is a part sectional side view of the rotor showing its casing or cylinder in section on line 4—4 of Fig. 1.

It has been noted that the rotor 30 is connected to the drive-member 20 by means engaging in its slots 25. Preferably, such means are of the anti-friction type and, as shown in Figs. 2 and 4, they may comprise ball-bearing rollers 57. The outer rim of the rotor 30 is provided at its bottom with a thickened wall 58 which is drilled to receive hollow studs or spindles 59 projecting through holes in the opposite wall. Two of these spindles are provided, they being arranged radially of the axis of the rotor to carry ball-races 60 fast thereon, between which and the outer annular rollers 57 are balls 61. The rollers 57 may be constructed in the form of races similar to those previously described, being free to turn on the balls 61; the rotor 30 being thus connected to rotate the member 20 to drive the shaft 10 and this connection being adapted to allow the oscillating movement of the rotor in the direction of its axis as the rollers 57 slide in the slots 25.

Figure 5:
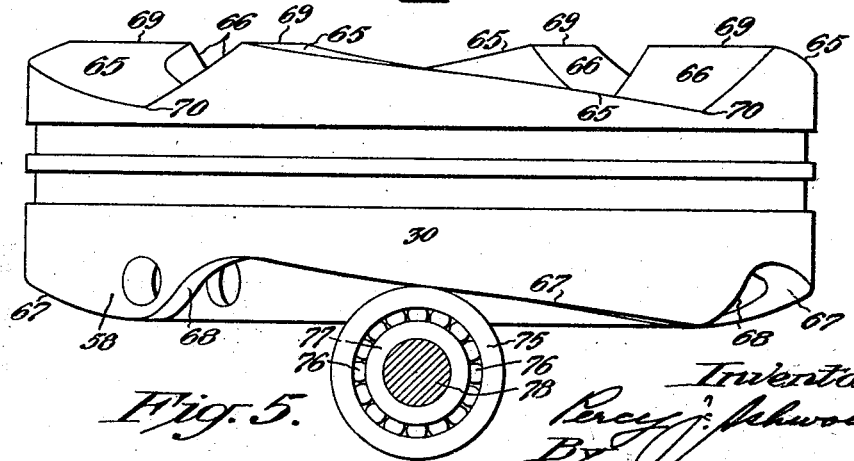
Fig. 5 is a side view of the rotor of the motor showing one of the roller-bearings for taking its axial thrust.

Referring now particularly to Figs. 4 and 5, the annular rotor 30 is constructed in a novel and peculiar manner to adapt it to co-operate with one of the end-heads of the cylinder 2 whereby, during its rotation, it opens and closes pockets constituting combustion-chambers into which the charge of fuel is drawn, compressed, and exploded to apply the propulsive force to the rotor. As shown in Figs. 4 and 5, the opposite sides of the rotor 30 are of undulatory configuration, being provided with inclined stepped faces of a predetermined angularity with respect to a plane perpendicular to its axis of the rotor. In the present embodiment there are four steps or rises on each side of the rotor comprising the relatively long, slightly inclined faces 65 and the shorter, more abrupt faces 66 on one side, and the similarly inclined long faces 67 and short faces 68 on the opposite side. Each side of the rotor is thus divided radially into four wedge-shaped sections, the high points 69 on one side coinciding with or being arranged opposite to the low points 70 on the other side. The inclined faces 65 and 66 co-operate with similarly inclined faces 71 and 72 provided on the interior of the annular end-head 4 to open and close pockets, indicated at 73, which constitute the combustion-chambers in the manner and for the purpose as hereinafter more fully explained. The longer inclined faces 65 on the rotor are complementary to the faces 71 on the head 4 to adapt them to ride thereagainst and slide thereon as the rotor 30 turns on its axis and is caused to oscillate in the direction of its axis due to this engagement. The shorter faces 66 on the rotor 30 are of slightly less inclination than the opposite faces 72 on the head 4 so that normally with the rotor in the position as shown in Fig. 4 these two faces will not conform. In other words, openings 73 are left between the faces 66 and faces 72 and these register with the ports 82 in the head of the motor, see Fig. 6, to provide for drawing the charges into the combustion chambers as the latter are increased in size by the turning of the rotor in the direction indicated by the arrow in Fig. 4. It is here noted that the combustion side of the rotor 30 is closed across its full width, the stops 65 and 66 bridging the space between its inner and outer walls. On the other hand, the opposite side of the rotor is partly open with the steps 67 and 68 formed on the edge of the thickened wall 58.

The purpose of forming the opposite side of the rotor 30 with an undulatory surface corresponding to that of the combustion side is to provide cam-faces co-operating with suitable bearings to maintain the rotor with its faces 65 substantially in contact with the faces 71 on the head 4. As herein illustrated, the end thrust-bearings for the rotor 30 comprise rotatable rollers 75 journaled on the interior walls of the casing 2 as shown in Fig. 4 to adapt the cam-faces 67 and 68 to ride thereon. The rollers 75 may be of the same construction as the rollers 57 which connect the rotor with the drive-member 20, being constituted as annular races turning on balls 76 running on inner annular races 77. The inner races 77 may be held on studs 78 projecting through bores in the sides of the cylinder 2 and secured in place by the nuts 79. In the present illustration I provide two rollers 75 for taking the axial thrust of the rotor 30 to maintain its face 65 in contact with the faces 71 on the head 4, but a greater number may be employed if desired in accordance with the size of the motor. As shown in Fig. 4, pockets 80 are provided in the end-head 3 for receiving the rollers 75, thus conserving space to reduce the whole length of the motor. It will be noted that whereas the inclined faces 65 and 66 on the combustion side of the rotor 30 meet in sharp points, on its opposite side of the cam-faces 67 and 68 are joined with a rounding contour to adapt them to ride smoothly over the rollers 75.

Figure 3:
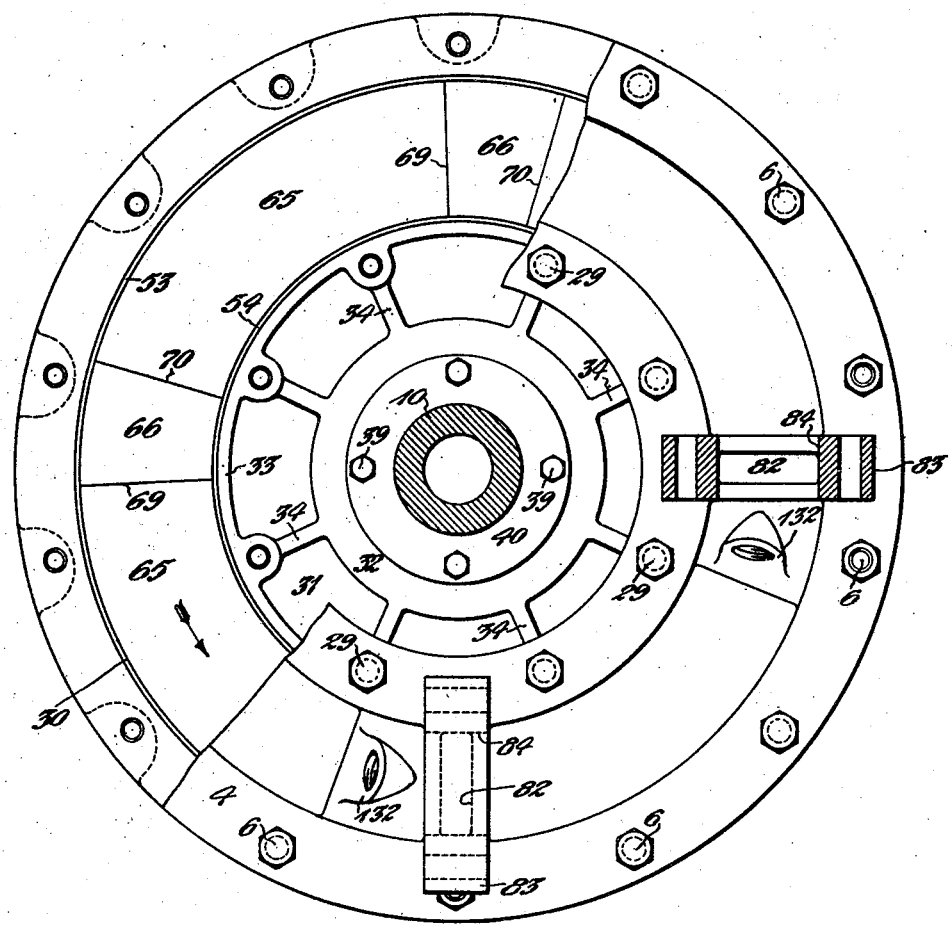
Fig. 3 is an end view of the motor casing or cylinder showing its head partly broken away to reveal the rotor and its mounting in the cylinder.
Figure 6:
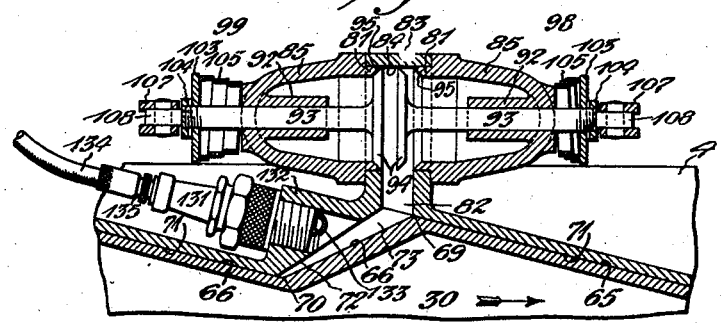
Fig. 6 is a fragmentary sectional view through the end-head of the motor taken on line 6—6 of Fig. 1 and showing the combined intake and exhaust port and the valves therefor.

Referring now to Figs. 1, 4 and 6, the intake- and exhaust-valves for the motor are of dual arrangement, there being a single opening or port 82 in the head 4 for each set of valves. As shown in Fig. 3, the head 4 is provided with integral, annular bosses 83 projecting therefrom at intervals around its circumference, there being four of these bosses for the embodiment of the invention as herein illustrated. The circular openings 84 within the bosses 83 communicate with the ports 82 opening through the head 4 and are adapted to receive valve-housings 85 suitably secured therein. As shown in Figs. 1 and 6, the valve-housings 85 have flanges 81 fitted to the openings 84, there being a separate valve-housing applied to each side of the boss 83. The valve-housings 85 are clamped in place on opposite sides of the bosses 83 by means of bolts 86 and 87. Suitable gaskets, not herein shown, may be employed for sealing the joints between the valve-housings 85 and the bosses 83. The bolts 86 extend clear through the outer walls of the housings 85 with nuts 88 at their ends, while the bolts 87 are of different construction to adapt them to serve as the supporting-posts for the rocker-arms which operate the valves. As shown in Fig. 1, each bolt 87 has a shouldered portion 89 abutting the flanged foot 90 of one housing and a nut 91 screwed against the similar foot 90 of the opposite housing.

All of the valve-housings 85 are of the same construction, being provided with quill-like bearings 92 for the stems 93 of the valves which have the usual mushroom heads 94. The heads 94 of the valves are formed with beveled rims to adapt them to seat in the beveled recesses 95 in the flanges 86 of the housings 85. For the sake of convenience of description the intake-valve in general is designated 98 and the exhaust-valve 99. It will be noted by reference to Fig. 1 that the interior passage through the valve-housings 85 are of L-shape and the openings thereof are directed outwardly at the circumference of the head 4 and provided with flanges 100. The flanges 100 are drilled and threaded to receive suitable studs 101 for bolting them to the flanges of suitable intake and exhaust manifolds not herein illustrated. The intake and exhaust manifolds may comprise arcuately-shaped pipe having flanged openings connected respectively to the flanges 100 of the intake-valve 98 and the exhaust-valve 99. The intake manifold may be connected with a carburetor or other suitable fuel-mixing device, and the exhaust manifold may have a connection leading to the atmosphere at any convenient location. These parts are not herein illustrated as they may be of any preferred construction and arrangement as well known to those versed in the art.

On the ends of the valve-stems 93 are circular disks or caps 103 secured in place by nuts 104. Compressed between the caps 103 and the ends of the valve-stem bearings 92 are flat spiral springs 105 which normally tend to maintain the heads of the valves closed against their seats 95.

The valves are operated by means of rocker-arms 107 which carry rollers 108 bearing against the ends of the valve-stems 93 to adapt them to slide the latter against the pressure of the springs 105. The rocker-arms 107 are pivoted on studs 109 carried in forked bearings 110 which are screwed onto the ends of the bolts or posts 87, previously referred to, and secured in fixed position by checknuts 111. It is noted here that the dual valves 98 and 99 of each set are disposed in alternate relation around the end-head 4 so that two intake-valves are located in adjacent relation and likewise two exhaust-valves are adjacent. The purpose of this arrangement is to provide that the rocker-arms for two adjacent intake-valves may be operated from a single push-rod or plunger; and likewise the rocker-arms for the adjoining exhaust-valves may be actuated from a single plunger so that in the present construction only four push-rods or plungers are required for actuating the eight valves. The rocker-arms 107 have tail-portions 112 which extend in opposite directions to cross each other in overlying relation. At the ends of the tail-portions 112 are hubs 113 bored to receive set-screws 114 which are provided with recessed or cupped ends. The cupped ends 115 of the set-screws 114 receive the rounded ends of link-pins or rods 116 connected to the push-rods 117 in the manner as later explained.

The push-rods 117 are of a novel and peculiar construction as next described. Screwed through threaded holes in the cylindrical wall of the hub 32 are tubular or cylindrical guides 118 formed with shoulders 119 which abut the outer surface of the hub. The push-rods 117 which slide in the guides 118 are preferably of hollow or tubular construction, their inner ends being slotted to receive rollers 120 which turn on pintles or trunnions 121 held in bearings at the sides of the slots. Inserted in the opposite ends of the push-rods 117 are studs 122 formed with overhanging flanged heads 123. The heads 123 have depending skirts 124 enclosing the outside of the guides 118 and provided with projecting annular flanges 125 which are formed with depressions or sockets 126 for receiving the rounded ends of the links 116 which, as previously explained, are correspondingly connected to the rocker-arms 107. It will be understood that as the push-rods 117 slide in their guides 118 under the action of the cams 44 and 45 bearing against their rollers 120 the links 116 will be caused to exert a thrust on the ends of the rocker-arms 107 to actuate the latter in the manner as later more fully explained. The set-screws 114 which engage the ends of the links 116 are adjustable to maintain a tight connection between the push-rods and the rocker-arms and to take up any excessive play caused by wear.

The construction and arrangement of the push-rods 117 is the same for all the valves, and it will be noted by reference to Fig. 15 of the drawings that the push-rods for the intake-valves 98 are offset or arranged in a different plane from that of the push-rods for the exhaust-valves 99. Through this arrangement the push-rods for the intake-valves are alined with the cam 45, while the push-rods for the exhaust-valves are disposed opposite the cam 44 so that the pairs of rocker-arms 107 which are arranged diametrically opposite each other on the head 4 are actuated in one case from one cam and in the other instance by the other cam, see Fig. 1. Referring to this latter view, the cam 45 for the intake-valves is provided with two opposite high points 129 having relatively long bearing faces; whereas the cam 44 for the exhaust-valves is provided with opposite high points 130 of sharper contour. The purpose of this difference in the construction of the cams will be later set forth in connection with the explanation of the method of operation of the valves.

The means for firing or detonating the charge drawn into the combustion-chambers may comprise suitable spark-plugs connected to a magneto or other make-and-break device for the electrical current. As shown in Figs. 3 and 6 the spark-plugs 131 are screwed into threaded bores extending through bosses or hubs 132 on the outer face of the end-head 4, a plug being provided adjacent each set of valves. The bores for the spark-plugs 131 intersect the wall of the head 4 on the shorter inclined faces 72 on its interior so that the sparking points 133 of the plugs are disposed adjacent to the pockets 73 formed by these faces and the co-operating faces 66 on the rotor 30, see Fig. 6. Conductors 134 connected to the firing-pins of the plugs 131 at 135 may be joined in a cable and led to the circuit-breaker or magneto which is placed at any convenient location in accordance with the use to which the motor is put, these connections not being herein shown in detail as they may be of any preferred arrangement.

The construction and arrangement of the essential parts of a motor exemplifying the present invention having now been described in detail, its method of operation will next be explained in connection with the diagrammatic views, Figs. 7 to 14. Fig. 7 illustrates the rotor 30 at the point in its revolution when the charge is about to be drawn into the combustion-chambers. For convenience of description the functioning will be explained in connection with one combustion-chamber only, it being understood that it is the same for all of them. It will be noted by reference to Fig. 7 that the exhaust-valve 99 is closed and the intake-valve 98 opened, the cams 44 and 45 being positioned in relation to the push-rod rollers 120 as shown in Fig. 8. As here illustrated, the opposite high points 129 on the cam 45 are turned into position beneath the rollers 120 on the push-rods 117 to slide the latter as shown in Fig. 1 whereby the rocker-arms 107 are moved to depress the valve-stems 93 to open all of the intake-valves 98 to admit the charge from the carburetor down through the ports 82. At this juncture the rollers 120 on the push-rods 117 for the exhaust-valves 99 ride on the cylindrical portion of the cam 44 so that the exhaust-valves remain closed as shown in Figs. 1 and 7.

In starting the motor the power-shaft 10 is cranked or otherwise rotated to turn the rotor in the direction indicated by the arrow in Fig. 7, and as its inclined faces 66 recede from the opposite inclined faces 72 on the head 4 a suction will be exerted to draw a charge of fuel through the intake-valves 98 and ports 82. As the rotor reaches the position illustrated in Fig. 9 the rollers 120 on the push-rods controlling the intake-valves 98 ride off from the high points 129 on the cam 45 and these valves are closed by the action of their springs. During this part of the revolution of the rotor 30 the long inclined faces 67 on its opposite side ride on the rollers 75 as the rotor is given a slight motion in the direction of its axis which causes it to recede from the head 4. Then as the motor continues to turn its sharper inclined faces 68 ride against the rollers 75 and the rotor will be oscillated in the opposite direction or toward the head 4 to effect what may be termed a compression stroke. During this axial movement of the rotor 30 its steps 65 move toward the correspondingly inclined faces 71 on the head 4 so that the charge in the combustion-chambers is compressed within the confines of the relatively narrow spaces between the succeeding shorter faces 66 on the rotor and the faces 72 on the head, see Fig. 11, the compression of the charge also taking place in the ports 82 and between the ends of the closed valve-heads 94.

At this point the charge is fired by the spark from the plug 131 through suitable control at the circuit-breaker or magneto operated in the usual manner. As the charge is exploded in each combustion-chamber a power impulse is exerted against the faces 66 of the rotor tending to turn it in the direction indicated by the arrow, it being here noted that the charges in all of the several combustion chambers may be exploded at substantially the same instant or with a progressive timing if desired. As the rotor is turned under the propulsive force of the several explosions it again recedes from the head 4 with its cam-faces 67 riding down the rollers 75 until it reaches the position illustrated in Fig. 13. At this juncture the several exhaust-valves 99 are opened by the action of the high points 130 on the cam 44 as shown in Fig. 14. The axial motion of the rotor 30 is now reversed as the faces 68 on its cam side ride against the rollers 75 and the next movement of the rotor toward the head 4 serves as a scavenging stroke to expel the burned gases from the combustion-chambers. That is to say, as the faces 65 on the rotor close against the corresponding faces 71 on the inside of the head 4 the residue of burned gases in the combustion-chambers will be forced out through the ports 82 and exhaust-valves 99.

At the end of the scavenging stroke the rotor 30 will have been carried into the position illustrated in Fig. 7 again, whereupon the exhaust-valves 99 are closed and the intake-valves 98 opened and the same cycle of operations as just described is repeated with the rotor drawing a fresh charge into the combustion-chambers and compressing the same, after which the spark-plugs explode the charge to apply the propulsive force to continue the turning movement of the rotor. With the present form of construction of the invention the propulsive force is applied to the rotor at two points during each complete rotation of the latter while the rotor oscillates to a slight extent in the direction of its axis or toward and away from the cylinder head 4. The speed of the motor may be controlled in the usual way by means of a throttle at the carburetor or other fuel supplying device.

The rotative movement of the rotor 30 is communicated to the power-shaft 10 through the medium of the driven-member 20 connected to the rotor by means of the rollers 57 engaging in its slots or openings 25. As before explained, this form of construction provides for the oscillating movement of the rotor, but it is to be understood that any other suitable construction of the driving connection between the rotor and the shaft may be employed.

It is to be particularly noted that the propulsive force generated by the explosion of the fuel in the combustion-chambers is applied to the rotor at or near its circumference so that the leverage on the power-shaft is in proportion to the size of the motor, and not restricted by limitations of space as in the case of the crank-shaft of the ordinary reciprocating engine. In other words, the propulsive force of the power impulse is applied with a maximum leverage, and this leverage maintained constant. Stated briefly, since the propulsive force is always exerted at the same distance from the axis of the rotor it remains constant as distinguished from the conditions in reciprocating engines employing crank-shafts. With the usual crank-shaft the leverage of the turning force increases from zero at the beginning of the power stroke to the maximum at the quarter or ninety degrees beyond the vertical, and from this point the leverage is reduced again to zero at the bottom of the stroke. It will be apparent therefore that the present construction of a motor embodying a rotor on which the power impulse is applied with a practically constant turning force provides greater efficiency over the reciprocating type of motor.

Another feature of improvement in the present invention results from the fact that the propulsive force is continuous in the direction of rotation of the driven part. In the reciprocating type of engine the pistons must come to a dead stop at the end of each stroke and their direction of movement be reversed. In the present improved motor there is no reversal in the direction of movement of the going parts, the power being applied with a smooth, even flow inasmuch as the rotor is always moving at a high speed at the moment of impact of the propulsive force on its steps. In the reciprocating type of motor the piston is stationary, or approximately so, at the movement of impact of the propulsive force and its movement must be started gradually and brought up to maximum speed during one half of the power stroke. This limitation of the reciprocating type of motor has a retarding effect against the power impulse. Stated briefly, there is no dead center in the present type of motor so that the power impulse is applied to much greater advantage and the power flow maintained more constant and uniform without acceleration and retardation. Furthermore, the effect of momentum and inertia on the moving parts is practically nil.

As another advantage the usual heavy fly-wheel necessary for the reciprocating type of motor may be dispensed with and the other parts of the motor correspondingly reduced in weight. The elimination of reciprocating pistons, connecting rods and the like increases the power output of the motor in proportion to the amount of fuel consumed since there is practically no power absorbed in moving or lifting weight at high speed, which in the reciprocating engine may amount to many pounds per minute. In the present motor the valves are operated from cams on the power-shaft thus eliminating the usual separate cam-shaft and its driving connections. The reduction in the number of operating parts as compared with the multi-cylinder reciprocating engine thus makes for greater economy in cost and the saving of weight which is a most important factor in engines or motors employed to propel aircraft.

The loss by friction is also practically overcome, the rotor of the present motor being the only running element. It is here noted that the packing rings which seal the rotor with the walls of the cylinder may be constructed of suitable anti-friction metal, and the relatively small area of these rings constitutes the only friction bearing surfaces, clearance being allowed between the periphery of the rotor and the cylinder in which it turns. A slight clearance may also be provided between the steps on the rotor and those on the head so as to reduce the friction between these surfaces.

The interior of the casing may constitute a reservoir for lubricant and due to the influence of centrifugal force the rotor will act to carry the oil outward and not into the combustion-chambers. For this reason carbon deposit on the parts is avoided and interference with the proper firing of the charge prevented.

The rotor of the present motor is practically fully floating and free from rigid connection with any of the other parts so that it supports only its own weight and exerts no thrust at any time against the wall of the casing in which it rotates. This provides an important advantage over the reciprocating type of engine wherein, as is well known, the action of the crank-shaft and piston rods exerts a lateral thrust on the pistons against the walls of the cylinders which creates a retarding effect or braking action resulting in loss of power and uneven wear in the bore of the cylinders.

The present improved motor is designed to effect rapid scavenging of the exhaust gases, the exhaust stroke of the rotor being accelerated, or at a faster rate than is the common practice in reciprocating engines. Furthermore, the exhaust-valves may be placed at widely separated points and arranged to exhaust at the same time. These provisions for the rapid and complete scavenging of the products of combustion tend to prevent overheating and further provide greater efficiency of the motor.

The present improved motor is particularly adapted for use on aircraft due to its simplicity and the small number of its operating parts which make for greater reliability. As another factor of importance in aircraft use the design of the motor insures a minimum of head resistance, due to its small frontal area as compared with the usual radial type of motor at present employed on airplanes.

The invention is herein shown and described as embodied in a unit of certain size and capacity having a preferred form of construction. It is to be observed, however, that the design and construction of the motor may be varied in various particulars without departing from the spirit or scope of the invention and therefore, without limitation in this respect.

I claim:

1. A rotary motor comprising a casing having inner and outer concentric walls forming an annular raceway with steps on its interior, a ring-like rotor rotatable in said raceway and provided with annularly disposed steps co-operating with those in the raceway of the casing to open and close combustion-chambers during the rotation of the rotor, means for introducing a charge of fuel into the combustion-chambers, and means to explode the charge to apply a propulsive force against the steps on the rotor to rotate the latter.

2. A rotary motor comprising a casing having inner and outer concentric walls forming an annular raceway with inclined stepped faces at one end thereof, an annular rotor rotatable and axially slidable in said raceway and provided with inclined stepped faces adapted to co-operate with the corresponding faces at the end of the raceway to open and close combustion-chambers therebetween, means for introducing a charge of fuel into the combustion-chambers, and means to explode the charge to apply a propulsive force against the steps on the rotor to rotate the latter.

3. A rotary motor comprising a casing having inner and outer concentric walls forming an annular raceway, a head at the end of the casing having inclined stepped faces projecting into the annular raceway, an annular rotor rotatable in the raceway and provided with stepped faces arranged in complemental relation to the faces on the head whereby the turning of the rotor causes it to open and close combustion-chambers between its faces and the opposite faces of the head, means for introducing a charge of fuel into the combustion-chambers, and means for exploding the fuel to apply a power impulse on the rotor to rotate the latter.

4. A rotary motor comprising a cylinder having inner and outer concentric walls forming an annular raceway with stepped faces on its interior inclined at an angle to a plane perpendicular to its axis, an annular rotor rotatable in the raceway and provided with inclined faces corresponding to the faces on the interior thereof to adapt them to co-act therewith to form combustion-chambers as the rotor turns and is given an axial oscillating movement in the casing, means for introducing a charge of fuel into the combustion-chambers formed between the opposite faces in the raceway and on the rotor, and means to explode the charge to apply a power impulse on the rotor to turn the latter.

5. A rotary motor comprising a cylinder having inner and outer concentric walls forming an annular raceway, a head at one end of the cylinder provided with stepped faces inclined at an angle to a plane perpendicular to its axis and projecting into the raceway, an annular rotor rotatable in the raceway and provided with stepped faces disposed in opposite arrangement to the faces on the head whereby the turning of the rotor will cause an oscillating movement to be imparted thereto to open and close combustion-chambers between its faces and the faces on the head, means to introduce a charge of fuel into the combustion-chambers, and means to explode the charge to apply a propulsive force against the stepped faces of the rotor to rotate the latter.

6. A rotary motor comprising a cylindrical casing having inner and outer concentric walls forming an annular raceway, a head at the end of said casing having stepped faces on its interior inclined at an angle to a plane perpendicular to the axis of the casing, an annular rotor rotatable in the raceway and provided with stepped faces disposed in opposite relation to the inclined faces on the head and also having corresponding cam-faces on its opposite side, bearings engaging against the cam-faces for taking the axial thrust of the rotor as it is given an axial oscillating motion during its rotation, means for admitting a charge of fuel into the spaces between the inclined faces of the head and rotor as the latter turns in the casing, and means to explode the charge to apply a propulsive force to rotate the rotor.

7. A rotary engine comprising a cylindrical casing, a head at the end of said casing, stepped faces on the interior of the head inclined at an angle to a plane perpendicular to the axis of the casing, a rotor rotatable within the csaing and provided with inclined faces corresponding to the stepped faces on the head, the opposite side of the rotor being provided with inclined cam-faces substantially complemental to the faces on the other side, roller-bearings engaging said cam-faces to adapt the rotor to oscillate axially during its rotation in the casing, means for introducing a charge of fuel into the spaces opened between the faces of the rotor and head as the rotor turns and oscillates in the casing, and means to explode the charge to apply a propulsive force on the stepped faces of the rotor to turn the latter.

8. A rotary engine comprising a casing having inner and outer concentric walls forming an annular raceway with a series of faces on its interior inclined at an angle to a plane perpendicular to its axis and alternating with other faces of greater inclination, an annular rotor rotatable in the casing and formed with a series of stepped faces substantially corresponding to those on the interior of the raceway whereby when said rotor turns and is caused to oscillate in an axial direction combustion-chambers are opened between its inclined faces and those on the raceway and thereafter said combustion-chambers are substantially closed to compress the charge of fuel introduced thereinto, means for introducing the charge of fuel into the combustion-chambers and means for exploding the charge to apply a propulsive force against the stepped faces of the rotor to rotate the latter.

9. In a rotary motor, the combination of a casing having inner and outer concentric walls forming an annular raceway on its interior an annular rotor rotatable in said raceway and provided with stepped faces on its side, means closing one end of the annular raceway and provided with stepped faces arranged substantially complementary to the stepped faces on the rotor whereby when the rotor turns and is caused to oscillate axially in the casing combustion-chambers are opened between its faces and those at the end of the raceway, means for introducing a charge of fuel into the combustion-chambers, and means for exploding the charge to apply a propulsive force against the stepped faces of the rotor to rotate the latter.

10. In a rotary motor, the combination of a casing having inner and outer concentric walls forming an annular raceway, an axial power-shaft journaled in bearings in said casing, a rotor rotatable in the raceway and provided with inclined stepped faces on its side, a head on the casing having inclined stepped faces arranged substantially complementary to the stepped faces on the rotor to adapt the latter to ride thereover to impart an axial oscillating motion to the rotor as it turns in the raceway whereby to cause certain of its faces to recede from those on the head to open combustion-chambers therebetween, means for introducing a charge of fuel into the combustion-chambers, means for exploding the charge to apply a propulsive force on the rotor to turn the latter, and means for rotatively connecting the rotor with the power-shaft.

11. In a rotary motor, the combination of a casing formed with an annular raceway on its interior, a head closing one end of the raceway and provided with stepped faces, a rotor rotatable in the raceway and provided with stepped faces corresponding to those on the head, a power-shaft extending axially of the casing and journaled in bearings therein, a drive-member keyed to said shaft and provided with an annular rim formed with slots, rollers on the rotor engaging the slots in the drive-member to connect it rotatively with the rotor while adapting the latter to oscillate axially with respect thereto, means for introducing a charge of fuel into the openings between the stepped faces of the head and the rotor when the latter is rotated, and means for exploding the charges to apply a propulsive force on the rotor to turn the latter.

12. In a rotary motor, the combination of a casing having inner and outer concentric walls forming an annular raceway with a series of stepped faces on its interior, an annular rotor rotatable in said raceway and provided with a series of stepped faces co-operating with those on the interior of the raceway whereby during its rotation it opens and closes combustion-chambers between the faces, intake-valves for admitting a charge of fuel into the combustion-chambers as the latter are opened by the rotation of the rotor, means for firing the charge in the combustion-chambers as the latter are closed during the rotation of the rotor to apply a propulsive force thereto, and exhaust-valves for exhausting the burned gases from the combustion-chambers after the force of the explosion is spent.

13. In a rotary motor, the combination of a casing having inner and outer concentric walls forming an annular raceway with stepped faces on its interior, an annular rotor rotatable in the casing and provided with stepped faces co-operating with the faces on the interior of the raceway to open and close combustion-chambers therebetween during the rotation of the rotor, intake-valves for admitting a charge of fuel to the combustion-chambers, means for exploding the charge in the combustion-chambers to apply a propulsive force against the steps on the rotor, exhaust-valves for exhausting the burned gases from the combustion-chambers after the force of the explosion is spent, and means operated from the rotation of the rotor to open and close the valves in predetermined order.

14. In a rotary motor, the combination of a casing having inner and outer concentric walls forming an annular raceway with stepped faces on its interior, an annular rotor rotatable in the raceway and provided with stepped faces adapted to co-operate with those on the interior of the raceway to open and close combustion-chambers between the faces, intake-valves for admitting a charge of fuel to the combustion-chambers, means for exploding the charge to apply a propulsive force on the rotor, exhaust-valves for exhausting the combustion-chambers, a power-shaft driven from the rotor, and cams on the power-shaft for operating the valves to open and close the latter in predetermined order.

15. In a rotary motor, the combination of a casing having inner and outer concentric walls forming an annular raceway, an axial power-shaft journaled in bearings in said casing, an annular rotor rotatable in the raceway and provided with stepped faces on its side, a head on the casing having stepped faces adapted to co-operate with those on the rotor to form combustion-chambers therebetween when the rotor is rotated, intake-valves for admitting a charge of fuel into the combustion-chambers, means for exploding the charge in the combustion-chambers to apply propulsive force to the rotor, exhaust-valves communicating with the combustion-chambers to exhaust the burned gases therefrom, and cams on the power-shaft adapted to act on the valves to open and close the latter in predetermined order.

16. In a rotary motor, the combination of a casing having inner and outer concentric walls forming an annular raceway, an annular rotor rotatable in the raceway and provided with stepped faces, a head on the casing having stepped faces co-operating with those on the rotor whereby to form combustion-chambers between the faces as the rotor is rotated, said head being provided with ports communicating with the combustion-chambers, intake- and exhaust-valves opening from said ports, rocker-arms for operating the intake- and exhaust-valves, means for exploding the charge introduced into the combustion-chambers through the intake-valves to apply a propulsive force on the rotor, a power-shaft driven from the rotor, cams on the power-shaft, and plungers operated from said cams to actuate the rocker-arms to open and close the valves in predetermined order.

17. In a rotary motor, the combination of a cylindrical casing, a head on the casing provided with stepped faces on its interior, a rotor rotatable in the casing and having stepped faces co-operating with those on the head to form combustion-chambers as the rotor is rotated in the casing, a series of ports arranged at intervals around the head in communication with the steps on its interior, a pair of intake- and exhaust-valves communicating with each port, means operated from the rotation of the rotor to open the intake-valves to admit a charge of fuel into the combustion-chambers, means to explode the charge in the combustion-chambers to apply a propulsive force to rotate the rotor, means to actuate the exhaust-valves to exhaust the combustion-chambers after the explosion of the charge, rocker-arms for actuating the valves, a push-rod for actuating the rocker-arms for two adjacent intake-valves, a cam for sliding said push-rod, a push-rod for operating the rocker-arms for two adjacent exhaust-valves, and a second cam for sliding the last named push-rod.

18. In a rotary engine, the combination of a casing, a rotor rotatable within the casing and formed to co-operate therewith to form combustion-chambers, a series of ports disposed around the casing in communication with the combustion-chambers therein, an intake-valve on one side of each port, an exhaust-valve on the opposite side of each port, said valves arranged in pairs with two intake- and two exhaust-valves in adjacent relationship, pairs of adjacent rocker-arms for operating the valves, a single push-rod for operating each pair of rocker-arms, a cam for operating the push-rods for the intake-valves, and a second cam for operating the push-rods for the exhaust-valves.

19. In a rotary engine, the combination of a casing having opposite concentric walls forming an annular raceway, an annular rotor rotatable within the raceway and adapted to co-operate therewith to form combustion-chambers, a port for each combustion-chamber, bosses on the casing formed with openings leading to the ports, valve-housings inserted into the openings in the bosses on opposite sides thereof, valves slidable within the housings, and means to operate the valves during the rotation of the rotor to admit a charge of fuel into the combustion-chambers and to exhaust the burned gases therefrom.

20. In a rotary motor, the combination of a cylindrical casing having opposite concentric walls forming an annular raceway, a head on said casing having stepped faces projecting into the raceway, an annular rotor rotatable within the raceway and provided with stepped faces co-operating with the faces on the head to form combustion-chambers, ports leading through the head into the combustion-chambers, bosses on the head having circular openings, valve-housings having flanges inserted into the openings in the bosses and arranged in opposed relation, bolts for clamping the housings in place against the bosses, valves slidable in the housings, and means for operating the valves to admit a charge of fuel into the combustion-chambers and to exhaust the burned gases therefrom.

In testimony whereof I hereunto affix my signature.

PERCY J. ASHWORTH.